US008763786B2

(12) United States Patent
Uchinashi

(10) Patent No.: US 8,763,786 B2
(45) Date of Patent: Jul. 1, 2014

(54) WORKPIECE FEEDING APPARATUS

(71) Applicants: Honda Motor Co., Ltd., Tokyo (JP); Honda Sun Co., Ltd., Oita (JP)

(72) Inventor: Yoshio Uchinashi, Oita (JP)

(73) Assignees: Honda Motor Co., Ltd., Tokyo (JP); Honda Sun Co., Ltd., Oita (JP)

(*) Notice: Subject to any disclaimer, the term of this patent is extended or adjusted under 35 U.S.C. 154(b) by 0 days.

(21) Appl. No.: 13/843,094

(22) Filed: Mar. 15, 2013

(65) Prior Publication Data

US 2014/0102861 A1 Apr. 17, 2014

(30) Foreign Application Priority Data

Oct. 15, 2012 (JP) ................................ 2012-227983

(51) Int. Cl.
*B65G 33/02* (2006.01)
*B65G 33/26* (2006.01)
*B65G 33/34* (2006.01)

(52) U.S. Cl.
CPC .............. *B65G 33/02* (2013.01); *B65G 33/265* (2013.01); *B65G 33/34* (2013.01); *B65G 2812/0527* (2013.01)
USPC ........... 198/671; 198/661; 198/674; 198/676; 198/677

(58) Field of Classification Search
CPC ...... B65G 33/02; B65G 33/265; B65G 33/34; B65G 2812/0527
USPC .......................... 198/661, 671, 674, 676, 677
See application file for complete search history.

(56) References Cited

U.S. PATENT DOCUMENTS 4,386,695 A * 6/1983 Olson .......................... 198/661
4,995,531 A * 2/1991 Summers ........................ 221/75
5,101,961 A * 4/1992 Bengtson et al. .......... 198/550.1
5,117,654 A * 6/1992 Steffenhagen .................. 62/344
5,154,275 A * 10/1992 Speckhart et al. ............ 198/416
5,269,402 A * 12/1993 Speckhart et al. ............ 198/416
5,975,279 A * 11/1999 Blattner et al. ............ 198/459.4
6,971,501 B2 * 12/2005 Beyer ........................ 198/459.3

FOREIGN PATENT DOCUMENTS

JP 59-112880 6/1984

* cited by examiner

*Primary Examiner* — Mark A Deuble
(74) *Attorney, Agent, or Firm* — Rankin, Hill & Clark LLP

(57) ABSTRACT

In a workpiece feeding apparatus having a rotating shaft adapted to rotate to separate and individually feed a plate-like workpiece suspended side by side in an axial direction along a helical region formed on an outer peripheral surface of the rotating shaft and drop the plate-like workpiece from an edge thereof and a motor rotating the rotating shaft, the rotating shaft includes a first rod connected to the motor, and a second rod rotatably connected to the first rod and having a helical region formed on the outer peripheral surface of the second rod and a workpiece hanger at the edge to extend perpendicular to the axial direction and to be bent at a distal end, such that the second rod stops rotating when the workpiece is hung from the distal end of the workpiece hanger.

8 Claims, 4 Drawing Sheets

20d
10
16
20b
14
20c
20a
20
22a
22
12
18b
18
18a
22c 22b

WORKPIECE FEEDING APPARATUS

BACKGROUND

1. Technical Field

This invention relates to a workpiece feeding apparatus, more particularly to a workpiece feeding apparatus equipped with a rotating shaft that rotates to separate and individually feed plate-like workpieces suspended side by side along a helical region formed on its outer peripheral surface.

2. Background Art

Conventionally, workpiece feeding apparatuses have been introduced for use during product assembly to separate aligned plate-like workpieces and feed (supply) them to the next process one by one, as taught, for example, by Japanese Laid-Open Patent Application No. S59 (1984)-112880.

In the reference, a chute for feeding aligned plate-like workpieces is supported to incline with respect to a horizontal plane and individually extract and feed the plate-like workpieces striking on a stopper installed at an end face of the chute in a direction perpendicular to the flow of the workpieces.

SUMMARY

The technology taught by the reference requires a complicated mechanism for feeding the aligned plate-like workpieces one by one. The apparatus therefore becomes large and high in cost. In addition, operation becomes complicated in a case where worker working efficiency suddenly declines in the course of the operation, because control of the plate-like workpiece feeding speed requires regulation of the power supply and motor rotational speed on each occasion.

An object of this invention is therefore to solve the aforesaid problem by providing a universal design concept workpiece feeding apparatus which, notwithstanding that it is of simple structure, can feed side-by-side-aligned plate-like workpieces one by one, and can easily match the timing of the plate-like workpiece feeding to the pace of the individual worker, thereby making it possible to adapt to each worker even when work efficiency varies greatly among different workers.

In order to achieve the object, embodiments of the invention provide a n apparatus for feeding a workpiece having a rotating shaft adapted to rotate to separate and individually feed a plate-like workpiece suspended side by side in an axial direction along a helical region formed on an outer peripheral surface of the rotating shaft and drop the workpiece from an edge thereof, and a motor rotating the rotating shaft, the wherein the improvement comprises: the rotating shaft includes a first rod having one end connected to the motor, and a second rod having one end rotatably connected to an other end of the first rod and an other end corresponding to the edge, the helical region formed on the outer peripheral surface between the one end of the second rod and the other end of the second rod, and a workpiece hanger provided at the edge to extend perpendicular to the axial direction of the second rod to be bent at a distal end, such that the second rod is adapted to stop rotating relative to the first rod when the workpiece is hung from the distal end of the workpiece hanger.

DESCRIPTION OF EMBODIMENT

Embodiments for implementing a workpiece feeding apparatus according to this invention are explained with reference to the drawings in the following.

Figure 1:
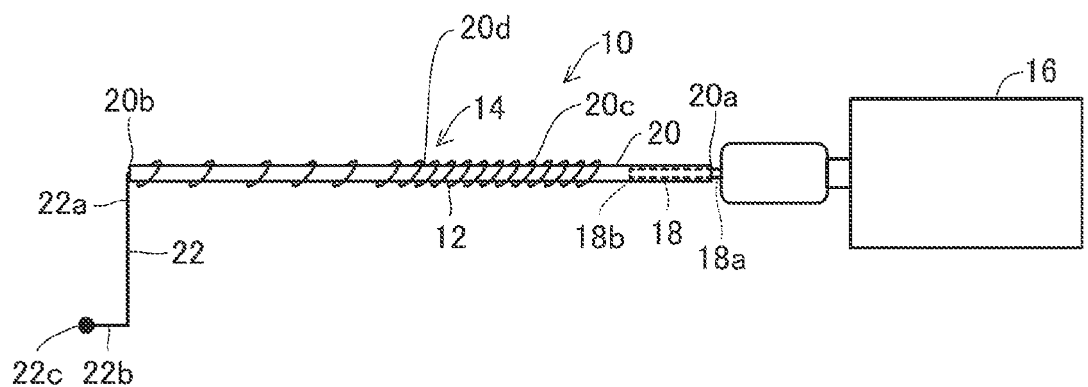
FIG. 1 is a diagram schematically showing a workpiece feeding apparatus according to a first embodiment of the invention.
Figure 2:
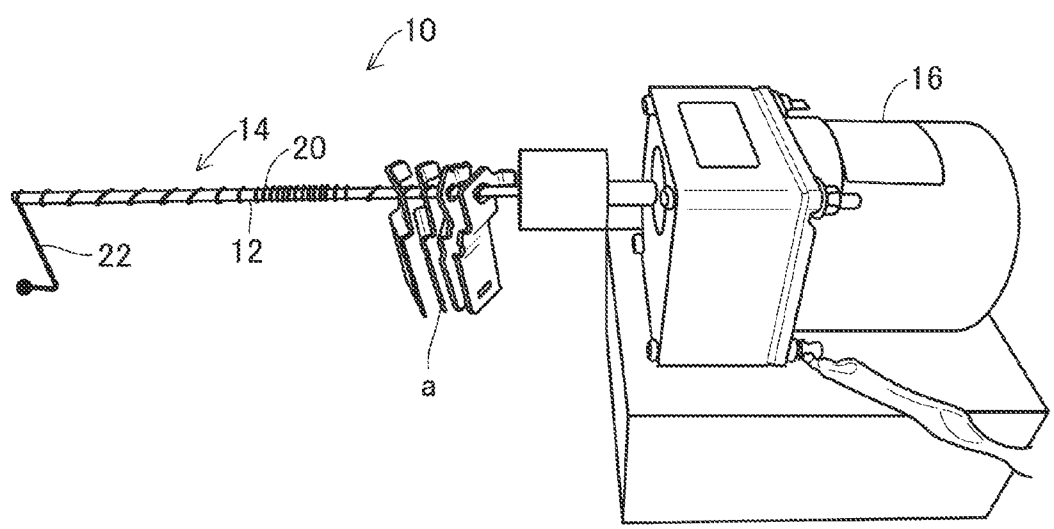
FIG. 2 is a perspective view of the workpiece feeding apparatus shown in FIG. 1.

FIG. 1 is a diagram schematically showing a workpiece feeding apparatus according to a first embodiment of the present invention, and FIG. 2 is a perspective view of the workpiece feeding apparatus. FIG. 3 is a set of explanatory views for explaining a plate-like workpiece used with the workpiece feeding apparatus, and FIG. 4 is a set of explanatory views for explaining a coupling structure between a first rod and second rod.

In FIGS. 1 and 2, symbol 10 designates a workpiece feeding apparatus. The workpiece feeding apparatus 10 is an apparatus for separating and individually feeding plate-like workpieces a suspended in a side-by-side condition. It is equipped with a rotating shaft 14 for suspending multiple workpieces a in side-by-side condition and rotating to separate and individually feed the suspended plate-like workpieces a in the axial direction along a helical region 12 formed on its outer peripheral surface, and a motor 16 for rotating the rotating shaft 14.

Figure 3A:
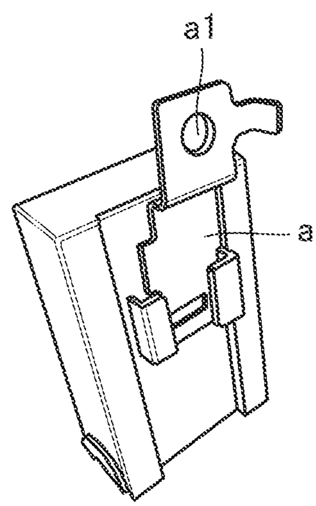
FIGS. 3A-3C are a set of explanatory views for explaining a plate-like workpiece used with the workpiece feeding apparatus shown in FIG. 1.
Figure 3B:
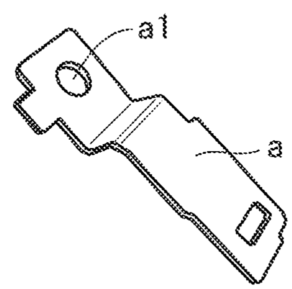
Figure 3C:
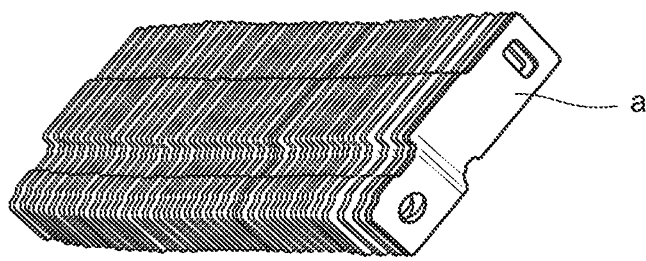

As shown in FIG. 3A, the workpiece a is, for example, a plate-like metal fitting for fastening to a vehicle body an electrical component used in an automobile or the like. As shown in FIG. 3B, the workpiece a is a plate formed into a crank-like shape and has a hole a1 near one end so as to be suspendable from a rod-shaped member or the like. The workpiece a is set (suspended) in the workpiece feeding apparatus 10 by passing the rotating shaft 14 through the hole a1. FIG. 3C shows a number of workpieces a aligned side by side. The workpieces a are set on the rotating shaft 14 in this condition (multiply in side-by-side orientation).

The explanation with reference to FIG. 1 will be continued. The rotating shaft 14 comprises a first rod 18 and a second rod 20. One end 18*a* of the first rod 18 is connected to the motor 16 and another end 18*b* thereof is connected to one end 20*a* of the second rod 20.

The helical region 12 is formed on the outer peripheral surface of the second rod 20, more specifically a shaft portion 20*c* extending between the one end 20*a* and another end 20*b* of the second rod 20. A workpiece hanger 22 with an L-like bend at the distal end is provided at the other end 20*b* of the second rod 20, i.e., the edge thereof, to extend in a direction intersecting the axial direction of the shaft portion 20*c*.

Figure 4A:
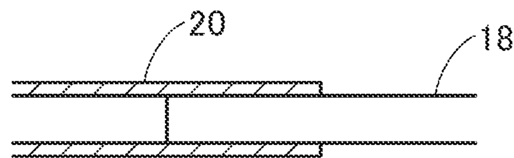
FIGS. 4A-4B are a set of explanatory views for explaining a coupling structure between a first rod and second rod according to the first embodiment.
Figure 4B:
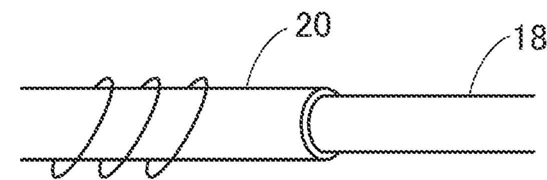

The second rod 20 is a hollow cylindrical member. As shown in FIGS. 4A and 4B (which are a sectional view and a perspective view respectively of the first rod 18 and second rod 20), the second rod 20 is sleeved onto the first rod 18. The second rod 20 is sleeved onto the first rod 18 with substantially no gap between the two. After the two have been coupled, therefore, insofar as no force of greater than a predetermined magnitude is applied to the second rod 20 in the rotational direction opposite to the rotational direction of the first rod 18, the second rod 20 rotates integrally with the first rod 18 owing to frictional resistance with the first rod 18 (frictional resistance between the outer peripheral surface of the first rod 18 and the inner peripheral surface of the second rod 20).

To continue the explanation of FIG. 1, the helical region 12 formed on the outer peripheral surface of the shaft portion 20*c* of the second rod 20 is a wire-shaped member helically wound along the outer peripheral surface of the shaft portion 20*c* in the axial direction. The wire-shaped member forms a helical ridge of the helical region 12.

The pitch of the helical region 12, i.e., the distance between adjacent turns of the helical ridge of the helical region 12, is configured to increase (spread) progressively from the middle region 20*d* of the second rod 20 (middle of the shaft portion 20*c*, i.e., a location corresponding to approximately midway the distance from the one end 20*a* to the other end 20*b* of the second rod 20) toward the other end 20*b*. This is so that workpieces a deployed side by side from the one end 20*a* toward the middle region 20*d* of the second rod 20 are individually separated as they are fed along the helical region 12 by rotation of the second rod 20 and additionally so that the distance between adjacent workpieces a increases toward the other end 20*b* of the second rod 20.

The pitch of the helical region 12 from the one end 20*a* to the middle region 20*d* of the second rod 20 can be configured to expand progressively, contract progressively or, of course, stay constant.

The workpiece hanger 22 with an L-like bend at the distal end is provided at the other end 20*b* of the second rod 20 to extend in a direction intersecting the axial direction of the shaft portion 20*c*. The workpiece hanger 22 comprises a long shaft 22*a* extending in a direction intersecting the axial direction of the shaft portion 20*c* (perpendicular to the axial direction in FIG. 1) and a short shaft 22*b* bent from the long shaft 22*a* in the axial direction like the horizontal stroke of the letter L.

The tip of the short shaft 22*b* of the workpiece hanger 22 is formed as a workpiece hanger tip 22*c* of spherical shape. A fed workpiece a striking against the workpiece hanger tip 22*c* can therefore be prevented from falling off the work hanger 22. In addition, the ability of a worker to work smoothly is ensured because the spherical shape of the workpiece hanger tip 22*c* lowers the risk of the plate-like workpiece a catching on the workpiece hanger tip 22*c* when the worker picks off the plate-like workpiece a.

The workpiece hanger 22 is fixed on the other end 20*b* of the second rod 20 and therefore rotates together with the rotation of the second rod 20. Further, when a workpiece a fed by the rotation of the second rod 20 reaches the other end 20*b*, i.e., the edge thereof, it drops along the long shaft 22*a* of the workpiece hanger 22 and hangs from the short shaft 22*b*.

The workpiece hanger 22 is one part of the wire-shaped member constituting the helical region 12 and is formed integrally with the wire-shaped member. Specifically, the wire-shaped member constituting the helical region 12 on the shaft portion 20*c* between the one end 20*a* and the other end 20*b* of the second rod 20 continues beyond the other end 20*b* of the second rod 20 to constitute the workpiece hanger 22 extending in a direction intersecting the axial direction. In other words, one part of the wire-shaped member constitutes the long shaft 22*a* and short shaft 22*b* of the workpiece hanger 22.

As pointed out earlier, the first rod 18 and second rod 20 are fitted together with substantially no gap between the two (see FIG. 4). The first rod 18 and second rod 20 therefore rotate integrally owing to the frictional resistance between the outer peripheral surface of the first rod 18 and the inner peripheral surface of the second rod 20. However, once a workpiece a fed by the rotation of the second rod 20 drops from the other end (edge) 20*b* of the second rod 20 to fall along the long shaft 22*a* of the workpiece hanger 22 and hangs from the short shaft 22*b* of the workpiece hanger 22, the weight of the workpiece a acts on the second rod 20 through the workpiece hanger 22. This causes slipping to occur between the first rod 18 and second rod 20, namely between the outer peripheral surface of the first rod 18 and the inner peripheral surface of the second rod 20. As a result, the first rod 18 rotates freely of the second rod 20, so that the second rod 20 no longer rotates even if the first rod 18 continues to rotate.

In other words, the "force acting on the second rod 20 through the workpiece hanger 22 owing to the weight of the workpiece a" referred to here corresponds to the aforesaid "force of greater than a predetermined magnitude applied to the second rod 20 in the rotational direction opposite to the rotational direction of the first rod 18." Thus, the configuration is such that the weight of the workpiece a acting on the second rod 20 overcomes the frictional resistance with the first rod 18 to cause slipping with respect to the first rod 18. The diameter, material and the like of the second rod 20 are therefore selected so to produce slipping relative to the first rod 18 and halt rotation with respect to the first rod 18 when a workpiece a is hanging from the end (short shaft) 22*b* of the workpiece hanger 22.

When the first rod 18 rotates freely of the second rod 20, the second rod 20 stops rotating, so that feeding of the workpieces a is no longer performed. The workpiece hanger 22 also stops rotating. As a result, the workpiece a hanging from the short shaft 22*b* of the workpiece hanger 22 is maintained at a predetermined location (ordinarily beneath the second rod 20 in the direction of gravity). This makes it easy for the worker to pick off the workpiece a.

After the worker picks off the workpiece a hanging from the short shaft 22*b* of the workpiece hanger 22, the frictional force between the first rod 18 and second rod 20 once again acts to start rotation of the second rod 20 together with the first rod 18, thereby restarting the workpiece a feeding operation.

Thus, the workpiece a feeding operation is halted until the worker picks off the workpiece a hanging on the short shaft 22*b* of the workpiece hanger 22. With this, it becomes possible to allow the worker to work at his or her own pace.

The motor 16 is adapted to rotate the first rod 18. In this embodiment, an induction motor that can be continuously operated in one direction at a constant speed simply by connection to an AC power source is used.

Figure 5A:
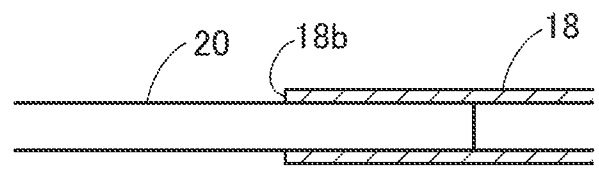
FIGS. 5A-5B are a set of explanatory views for explaining a coupling structure between the first rod and second rod according to a second embodiment.
Figure 5B:
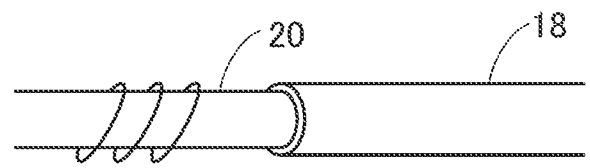

FIG. 5 is a set of explanatory views for explaining a coupling structure between the first rod 18 and second rod 20 according to a second embodiment. FIG. 5A is a sectional view of the first rod 18 and second rod 20, and FIG. 5B is a perspective view thereof.

In the configuration according to the first embodiment, as shown in FIG. 4, the second rod 20 is sleeved onto the exterior of the first rod 18. In the second embodiment, as shown in FIG. 5, the other end 18*b* of the first rod 18 is hollow and the second rod 20 is inserted into the hollow portion of the first rod 18.

In the second embodiment, analogously to in the first embodiment, the second rod 20 is fitted into the first rod 18 with substantially no gap between the two. After the second rod 20 has been fitted into the first rod 18, therefore, insofar as no force of greater than a predetermined magnitude is applied to the second rod, the second rod 20 rotates integrally with the first rod 18 owing to frictional resistance with the first rod 18 (frictional resistance between the inner peripheral surface of the first rod 18 and the outer peripheral surface of the second rod 20). Once a workpiece a is hung from the short shaft 22*b* of the workpiece hanger 22, the aforesaid predetermined force owing to the weight of the workpiece a acts to cause slipping between the first rod 18 and second rod 20. As a result, the first rod 18 rotates freely of the second rod 20 and the second rod 20 therefore stops rotating.

The remaining aspects of the configuration are the same as those of the first embodiment and will not be explained again.

Figure 6:
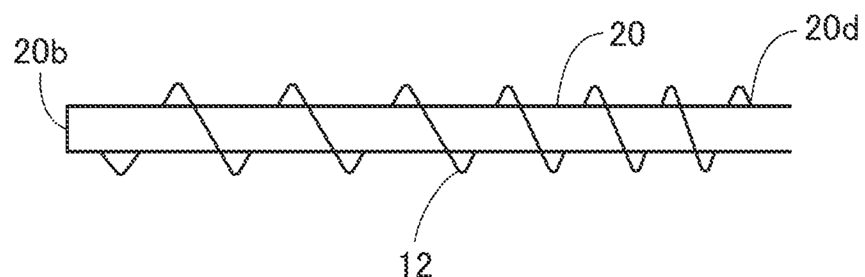
FIG. 6 is an explanatory view for explaining a helical region according to a third embodiment.

FIG. 6 is an explanatory view for explaining a helical region according to a third embodiment.

In the first embodiment, the wire-shaped member helically wound on the outer peripheral surface of the shaft portion of the second rod 20 forms the helical region 12 (see FIG. 1). In the third embodiment, as shown in FIG. 6, the outer peripheral surface of the shaft portion 20*c* of the second rod 20 is directly machined to form a helical ridge and a helical groove. The pitch between adjacent turns of the helical ridge of the helical region 12 is, of course, configured to increase (spread) progressively from the middle region 20*d* of the second rod 20 toward the other end 20*b*, and is the same as the first embodiment in this point. The third embodiment is also the same as the first embodiment in the point that the workpiece hanger 22 is provided at the other end 20*b* of the second rod 20.

The remaining aspects of the configuration are the same as those of the first embodiment or second embodiment and will not be explained again.

As stated above, the first to third embodiments of this invention are configured to have an apparatus for feeding a workpiece having a rotating shaft 14 adapted to rotate to separate and individually feed a plate-like workpiece a suspended side by side in an axial direction along a helical region 12 formed on an outer peripheral surface of the rotating shaft 14 and drop the workpiece a from an edge 20*b* thereof, and a motor 16 rotating the rotating shaft 14, wherein the improvement comprises: the rotating shaft 14 includes a first rod 18 having one end 18*a* connected to the motor 16, and a second rod 20 having one end 20*a* rotatably connected to an other end 18*b* of the first rod 18 and an other end 20*b* corresponding to the edge, the helical region 12 formed on the outer peripheral surface between the one end 20*a* of the second rod and the other end 20*b* of the second rod 20, and a workpiece hanger 22 provided at the edge 20*b* to extend perpendicular to the axial direction of the second rod 20 to be bent at a distal end 22*b*, such that the second rod 20 is adapted to stop rotating relative to the first rod 18 when the workpiece a is hung from the distal end 22*b* of the workpiece hanger 22.

With this, it therefore becomes possible to feed suspended plate-like workpieces a one by one without increasing cost and with a simple structure. In addition, the fed plate-like workpieces a are individually dropped from the other end (edge) 20*b* of the rotating shaft 14 and hung from the workpiece hanger 20, specifically, the short shaft 22*b* of the workpiece hanger 22, so that the plate-like workpieces a can be easily taken off one by one.

Moreover, when a plate-like workpiece a is hanging from the distal end (short shaft) 22*b* of the workpiece hanger 22, the second rod 20 remains in a nonrotating condition insofar as the worker does not pick off the suspended plate-like workpiece a from the workpiece hanger 22. The feeding and picking off the plate-like workpieces a can therefore be simply timed to match the work pace of the individual worker, so that it is possible to provide a universal design concept workpiece feeding apparatus that can adapt to each worker even when work efficiency varies greatly among different workers. In addition, the acceptability of workers for assignment to jobs at the process where the workpiece feeding apparatus 10 is installed can be enhanced.

In the apparatus according to the first to third embodiments of this invention, the improvement further comprises that a pitch of the helical region formed on the outer peripheral surface of the second rod is increased from a middle region toward the edge progressively.

With this, since the plate-like workpieces a suspended side by side can be reliably separated and fed, it is possible to feed and pick off the plate-like workpieces a reliably and easily.

In the apparatus according to the first to third embodiments of this invention, the distal end of the workpiece hanger has a workpiece hanger tip of a spherical shape.

With this, it is possible to prevent a fed plate-like workpiece a from falling off the workpiece hanger tip 22*c* of the workpiece hanger 22. Further, since the spherical shape of the workpiece hanger tip 22*c* lowers the risk of the plate-like workpiece a catching on the workpiece hanger tip 22*c* of the workpiece hanger 22 when the worker picks off the plate-like workpiece a, it becomes possible for the worker to perform the work smoothly.

In the apparatus according to the first and second embodiments of this invention, since the helical region formed on the outer peripheral surface of the second rod comprises a wire helically wound along the outer peripheral surface of the second rod, it becomes possible to feed the plate-like workpieces a suspended side by side to be fed by one by one with an even simpler structure.

In the apparatus, according to the first and second embodiments of this invention since the workpiece hanger is formed integrally with the helical region, it becomes possible to feed the plate-like workpieces a suspended side by side to be fed one by one with an even simpler structure.

In the apparatus, since according to the third embodiment of this invention, since the helical region comprises a helical ridge and a helical groove directly machined on the outer peripheral surface of the second rod, it becomes possible to feed the plate-like workpieces a suspended side by side to be fed one by one with an even simpler structure.

In the apparatus according to the second embodiment of this invention, since the first rod comprises a hollow cylindrical member and rotatably sleeved onto the second rod, it becomes possible to feed the plate-like workpieces a suspended side by side to be fed one by one with an even simpler structure.

In the apparatus according to the first embodiment of this invention, since the second rod comprises a hollow cylindrical member and rotatably sleeved onto the first rod, it becomes possible to feed the plate-like workpieces a suspended side by side to be fed one by one with an even simpler structure.

Although the workpiece a is a plate-like metal fitting for fastening an electrical component used in an automobile or the like to the vehicle body, this is only an example and the workpiece can be of any type insofar as it has a hole or hook enabling suspension from the second rod 20.

Although one part of the wire-shaped member constituting the helical region 12 is used to configure the workpiece hanger 22 in the first and second embodiments, this is not necessarily a limitation and it is possible to fabricate the workpiece hanger 22 separately of the wire member forming the helical region 12 and additionally attach it to the other end 20*b* of the second rod 20.

Although the distal end (short shaft 22*b*) of the workpiece hanger 22 was explained as being L-shaped, it can instead be of hook type with a U-shape or J-shape, for example, and the shape of the short shaft 22*b* of the workpiece hanger 22 does not matter insofar as a workpiece a dropped along the long shaft 22*a* of the workpiece hanger 22 can be hung therefrom.

Although the workpiece hanger tip 22*c* was explained as being spherical, the shape of the workpiece hanger tip 22*c* is not necessarily limited to spherical and can be ellipsoid, conical or other shape insofar as it can prevent a fed workpiece from falling off the workpiece hanger tip 22*c*.

Although an induction motor that the operates continuously in one direction was given as an example of the motor 16, this is not necessarily a limitation and it can instead be a reversible motor capable of switching between forward rotation and reverse rotation or a motor with an electromagnetic brake that can stop midway and maintain the stopped position. In other words, insofar as the motor can operate continuously in one direction, the presence or absence of other capabilities is not a concern.

Although the motor 16 was indicated as the means for rotating the first rod 18, this is not necessarily a limitation and it is possible instead, for example, to rotate the first rod 18 manually.

In the first embodiment, the second rod 20 is configured as a hollow cylindrical member so that the second rod 20 can be sleeved onto the first rod 18. However, it suffices for only a predetermined length from the one end 20*a* toward the other end 20*b* of the second rod 20, namely, only one part of the shaft portion 20*c* of the second rod 20, to be hollow.

Japanese Patent Application No. 2012-227983, filed on Oct. 15, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A workpiece feeding apparatus having a rotating shaft adapted to rotate to separate and individually feed a plate-like workpiece suspended side by side in an axial direction along a helical region formed on an outer peripheral surface of the rotating shaft and drop the workpiece from an edge thereof, and a motor rotating the rotating shaft, wherein the improvement comprises:

the rotating shaft includes a first rod having one end connected to the motor, and a second rod having one end rotatably connected to an other end of the first rod and an other end corresponding to the edge, the helical region formed on the outer peripheral surface between the one end of the second rod and the other end of the second rod, and a workpiece hanger provided at the edge to extend perpendicular to the axial direction of the second rod to be bent at a distal end, such that the second rod is adapted to stop rotating relative to the first rod when the workpiece is hung from the distal end of the workpiece hanger.

2. The apparatus according to claim 1, wherein a pitch of the helical region formed on the outer peripheral surface of the second rod is increased from a middle region toward the edge progressively.

3. The apparatus according to claim 1, wherein the distal end of the workpiece hanger has a workpiece hanger tip of a spherical shape.

4. The apparatus according to claim 1, wherein the helical region formed on the outer peripheral surface of the second rod comprises a wire helically wound along the outer peripheral surface of the second rod.

5. The apparatus according to claim 1, wherein the workpiece hanger is formed integrally with the helical region.

6. The apparatus according to claim 1, wherein the helical region comprises a helical ridge and a helical groove directly machined on the outer peripheral surface of the second rod.

7. The apparatus according to claim 1, wherein the first rod comprises a hollow cylindrical member and rotatably sleeved onto the second rod.

8. The apparatus according to claim 1, wherein the second rod comprises a hollow cylindrical member and rotatably sleeved onto the first rod.

* * * * *